(12) United States Patent
Sugimoto et al.

(10) Patent No.: US 6,269,924 B1
(45) Date of Patent: Aug. 7, 2001

(54) METHOD AND APPARATUS FOR CONTROLLING MACHINERY

(75) Inventors: Noboru Sugimoto, Koganei; Tsuyoshi Saito, Hachioji, both of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/209,278

(22) Filed: Dec. 11, 1998

(30) Foreign Application Priority Data

Mar. 31, 1998 (JP) .................................................. 10-087508

(51) Int. Cl.$^7$ ....................................................... F16D 35/00
(52) U.S. Cl. ............................................ 192/21.5; 192/58.4
(58) Field of Search ................................ 192/21.5, 58.4, 192/58.41, 58.61; 188/267.2; 267/140.14

(56) References Cited

U.S. PATENT DOCUMENTS

| 4,220,580 | * | 9/1980 | Rowatt ................................. 524/492 |
| 5,052,662 | * | 10/1991 | Doi ................................. 267/140.14 |
| 5,125,759 | * | 6/1992 | Chun ....................................... 403/24 |
| 6,095,295 | * | 8/2000 | Park et al. ......................... 188/267.2 |

FOREIGN PATENT DOCUMENTS 30 05 453 A1 * 8/1981 (DE) .

OTHER PUBLICATIONS

"Experimental Evaluation of Precision Positioning Mechanism Using Bingham Fluidity of Electro–Rheological Fluid", T. Saito et al., Autumn Lecture Meeting for Oil/Air Pressure, Oct. 23, 1997, pp. 45–47.

"A New Servo Method with an Electro–Rheological (ER) Fluid–An Application of a Variable Bingham Fluidity to Mechanical Control Systems–", N. Sugimoto, et al., Dec. 19, 1997.

* cited by examiner

Primary Examiner—Richard M. Lorence
(74) Attorney, Agent, or Firm—McDermott, Will & Emery

(57) ABSTRACT

The present invention realizes a high-precision positioning with high stability, by fully utilizing a Bingham fluid characteristic possessed by an ERF (electro-rheological fluid). To this end, motion of a driving part is transmitted to a movable part via shearing stress of the ERF. Since the shearing stress can be variably controlled by adjusting an electric field to be applied to the ERF, the movable part can be moved to a target position by a predetermined output. When the movable part is to be stopped, the driving part is decelerated and stopped to thereby thermally dissipate an excessive kinetic energy of the movable part. By keeping on applying an electric field at the time of stopping, the movable part is exerted with an infinite apparent viscous stress by virtue of the Bingham fluid characteristic, to thereby suppress an influence of an external force. Further, by constituting a damping or braking part to include an ERF, it also becomes possible to render the shearing stress of ERF to act as a resisting force, thereby damping a motion of the movable part.

17 Claims, 10 Drawing Sheets (a) INERTIA: 2.0 [gm²]

(b) INERTIA: 5.7 [gm²]

ROBOT    HUMAN BODY

METHOD AND APPARATUS FOR CONTROLLING MACHINERY

FIELD OF ART

The present invention relates to a method and an apparatus for controlling a machine utilizing fluid characteristics of an electro-rheological fluid (referred to as "ERF" hereinafter) which is one of variable Bingham fluids.

BACKGROUND ART

An ERF is a fluid the rheology characteristics of which vary reversibly and rapidly up to a remarkable extent, in response to application of an electric field.

For example, an ERF of particle dispersion system, which comprises an insulating oil suspended with solid particles, has such a characteristic that, upon application of an electric field, the ERF transforms from a Newtonian fluid into a Bingham fluid which exhibits a yield value corresponding to a magnitude of the applied electric field.

There have been made a variety of proposals such as a variable dumper and engine mount, as those machine control systems which utilize the unique characteristic noted above.

For example, servo valve and hydraulic actuator both adopting the ERF as working oil can be drastically downsized since they are free from movable parts, and it is expected to apply them such as to those fields of a fine operation and micromechanics.

Further, those actuators adopting a system, in which a force is transmitted and output from a driving part via ERF to a driven part, can realize a precise force control with high-speed response, so that such actuators have been applied to a prototype of a force sense presenting device in a virtual reality system.

Unfortunately, most of such various approaches have rarely succeeded in actually reaching a practical level.

One reason therefor will be that the aforementioned control systems have failed to pay attention to a Bingham fluid characteristic which is the most remarkable feature the ERF has. As such, the best use of uniqueness of ERF as a control device has not been sufficiently realized.

There will be now explained the aforementioned Bingham fluid characteristic, hereinafter.

Generally, it is possible to represent a shearing stress $\tau$ of a Bingham fluid, by a sum of: a yield shearing stress $\tau_s$ to be maintained even after the flowing has begun; and a shearing stress $\tau_v$ due to viscosity; by the following equation:

$$\tau = \tau_s + \tau_v = \tau_s + \eta_B \cdot \gamma \qquad (1)$$

wherein $\gamma$ is a shear rate, and $\eta_B$ is a viscosity coefficient which is linear to the shear rate of the Bingham fluid.

The variable Bingham fluids have such a property that their yield shearing stress $\tau_s$ scan be variably controlled.

Among them, an ERF has such a property that its yield shearing stress $\tau_s$ can be variably controlled by an applied electric field. The fluid characteristics of ERF can be represented by the following equation:

$$\tau = \tau_E(E) + \eta \cdot \gamma \qquad (2)$$

wherein $\eta$ is a viscosity coefficient at the time of no electric field, E is an applied electric field, and $\tau_E(E)$ is a yield shearing stress induced by application of the electric field ($\tau_E(E)$ shall be referred to as "induced yield stress" hereinafter).

As a typical example, an ERF, which comprises a silicone oil and carbon particles, surfaces of which are applied with insulation treatment, has a property to exhibit a substantially constant shearing stress irrespectively of the value of the shear rate, upon application of an electric field. Namely, the viscosity has an effect remarkably smaller than that of the induced yield stress.

Thus, it can be said that an ERF generates a finite shearing stress corresponding to a magnitude of an applied electric field, even when a shear rate is extremely small.

Then, by persistently interpreting the change of shearing stress represented by the equation (2) as being an apparent change of viscosity relative to a shear rate, the shearing stress can be represented by the following equation:

$$\tau = \eta(E) \cdot \gamma = (\eta + \tau_E(E)/\gamma) \cdot \gamma \qquad (3)$$

wherein $\eta(E)$ is an apparent variable viscosity coefficient.

As noted above, since ERF generates a finite shearing stress even relative to a small shear rate, the following equation can be established:

$$lim_{\gamma \to 0} \eta(E) = lim_{\gamma \to 0} [\tau_E(E)/\gamma] = \infty \qquad (4).$$

Namely, an ERF applied with an electric field can be regarded as a fluid having an infinite viscosity coefficient under the condition of $\gamma=0$. This is the Bingham fluid characteristic just noticed in the present invention.

There has been reported an example which has noticed this Bingham fluid characteristic, in an article titled "Experimental Evaluation of Precision Positioning Mechanism Using Bingham Fluidity of Electro-Rheological Fluid" as presented in an Autumn Lecture Meeting for Oil/Air Pressure held Oct. 23, 1997. However, the article has merely mentioned a basic concept, without referring a concrete development for a practical use.

In view of the above, it is therefore an object of the present invention to fully utilize the characteristics of variable Bingham fluids (inclusive of those mediums having characteristics same with those of the Bingham fluid characteristics), to thereby enhance a practical applicability of variable Bingham fluids to a machine control system.

DISCLOSURE OF THE INVENTION

It is therefore a first object of the present invention to provide a method and an apparatus for controlling a machine constituted to include a movable part, and a driving part for driving the movable part in a predetermined direction via shearing stress of a variable Bingham fluid.

To this end, the shearing stress of the variable Bingham fluid is variably controlled correspondingly to an output of the movable part. The control of the shearing stress can be readily attained by controlling an applied electric field.

Further, when the movable part is to be stopped, the driving part is decelerated and stopped. Namely, damping of the movable part is effected by thermal dissipation of an excessive kinetic energy of the movable part, by virtue of deceleration of the driving part. Thus, smooth damping is possible, and there is no fear that the movable part would be accelerated erroneously.

In addition, by keeping on applying an electric field when the movable part is stopped and maintained, the movable part is exerted with a predetermined damping force by virtue of the aforementioned Bingham fluid characteristic, to thereby suppress an influence such as disturbance.

In the above, if the driving part is constituted of a first driving portion for driving the movable part in a predetermined direction and a second driving portion for driving the movable part in another direction opposite to the predetermined direction, the movable part can be moved to a target position more precisely.

Namely, even when the movable part has failed the target position, a positioning control with high precision is made possible, by controlling the applied electric field to thereby switch the direction of a driving force acting on the movable part so as to switch the moving direction of the movable part and by decelerating the first driving portion and the second driving portion in a manner same with the above, so that the vibration of the movable part about the target position is smoothly attenuated.

It is another object of the present invention to provide a method and an apparatus for controlling a machine constituted to include a movable part, and a damping part for damping the movable part via shearing stress of a variable Bingham fluid.

To this end, the shearing stress of the variable Bingham fluid is controlled correspondingly to a variation of a frictional resistance of the movable part.

Thus, the moving resistance of the movable part (i.e., a mixed damping force of the frictional resistance and a damping force generated by the damping part) can be discretionarily controlled irrespectively of a friction characteristic of the movable part, such as to compensate (improve) a non-linear friction characteristic of the movable part, to thereby avoid a so-called running away state attributable to a sudden change of a frictional force, thus to suppress a so-called stick-slip.

When the moving resistance of the movable part is controlled to a predetermined value, it is preferable to control such that the moving resistance of the movable part increases correspondingly to an increase of a moving speed of the movable part, or such that the moving resistance of the movable part becomes substantially constant irrespectively of a variation of the moving speed of the movable part.

It is still another object of the present invention to provide a cooperative working control system for enabling a cooperative working where a human and a machine (such as coexistence robot) constituted to include a variable Bingham fluid directly contact to interact with each other, making use of the Bingham fluid characteristic.

There will become apparent the characteristic constitution and the functions and effects based thereon of the present invention, from the following embodiments.

BEST MODE FOR CARRYING OUT THE INVENTION

Figure 1:
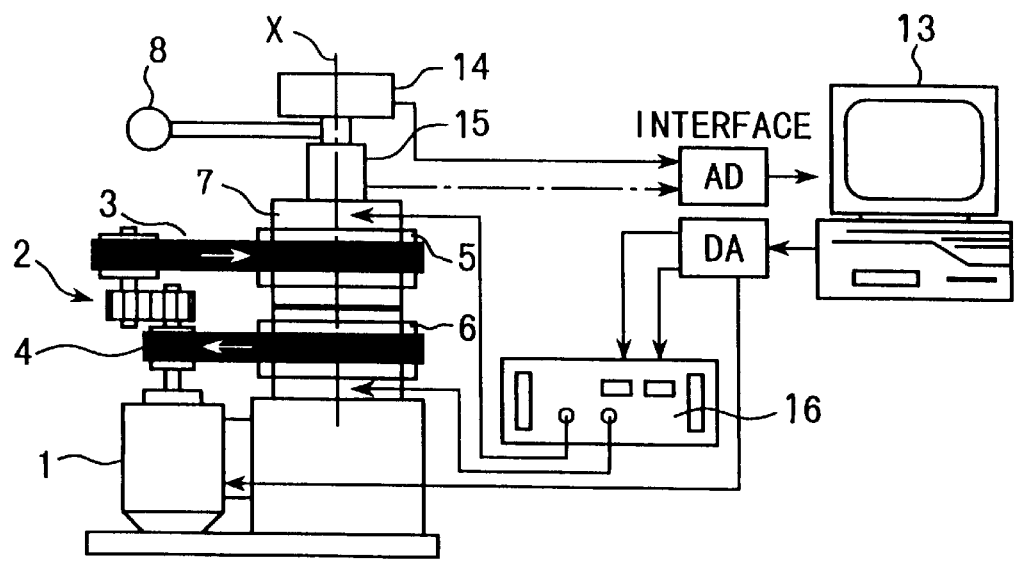
FIG. 1 is a schematic constitutional view explaining a control system according to a first embodiment of the present invention.

A first embodiment of the present invention provides a positioning control of a movable part, with higher precision, by utilizing the characteristics of ERF.

In a conventional control theory for controlling a motion of a movable part of a machine inclusive of a robot, there has been conducted a discretional motion of the movable part, such as by a feedback control in which a driving device (such as actuator to be controlled) for driving the movable part is moved or operated proportionally in accordance with a motion control signal (i.e., a deviation between a target value and a current position).

However, if it is intended to stop the movable part at a target position with high precision even under influence of an external force as disturbance, according to such a conventional control theory, there is theoretically required an extremely large proportional coefficient (servo gain) which can be regarded as being infinite, between the deviation and the output of the driving device.

To realize this characteristic, there are required such as position sensor and driving device both with high performance, but any position control devices satisfying these conditions have not been practically established yet.

As such, in a conventional machine aiming at precise positioning, there have been made such an endeavor that a product precision and rigidity of the whole device are improved to allow negligence of influencing disturbance, or that a driving device having a narrow motion range is utilized to equivalently enhance a positional resolution.

However, all of these endeavors have tried such as to improve the response ability and control precision of the device, leaving the conventional proportional control method as it is. Thus, although a certain improvement may be effected, a limit exists in a self-explanatory manner.

Further, since the above endeavors result such as in complication of the device as a whole and increase in cost, there have been still strongly demanded realization of a control system such as a robot capable of performing precise positioning in a simple manner at low cost, over the current industrial field, in fact.

Meanwhile, practically in the characteristic of a control system, which can be regarded as having an infinite servo gain, the output of the driving device sensitively reacts up to a rated power upon generation of a slight deviation.

Namely, in this system, the output of the driving device for driving the movable part does not operate in a manner proportional to a deviation between a target value and a current position, thus there is adopted such a control method that a movable part is operated to perform a discretional motion, by an instantaneous switching motion between several separate motion states such as an off state, a positive direction full motion state, and a negative direction full motion state.

This type of method is superior, concerning economical point and working efficiency, to the aforementioned proportional control method, such as in that a complicated thus expensive linear amplifier is not required, and that the rated output of the driving device can be fully utilized. This type of method is called "switching control method" to distinguish it from the proportional control method.

In this type of method, however, there will practically occur a continuous vibration motion (so-called "limit cycle") about a target value as a center point, such as due to influence of control delay. Thus, it has been considerably difficult to attain positioning with high precision based on the switching control method.

The present inventors have confirmed such a phenomenon that a certain proportional relationship can be established between an amplitude of the aforementioned continuous vibration and an energy amount supplied to the driving device, after lengthy and laborious study about positioning with high precision by means of the switching control method in a driving device (actuator) constituted to contain ERF.

Concretely, it was possible to render a movable part of a machine to reach a target value with a remarkably high precision when the continuous vibration had been converted toward the target value and then the operation of a driving device had ultimately stopped completely, by performing a switching control operation in which a direction of output was instantaneously switched to a negative direction when the deviation was in a positive side and switched to a positive direction when the deviation was in a negative side, under such a situation that: there had been blocked a supply energy (such as electrical power to be supplied to a motor as a driving source of the movable part) to the driving device constituted to contain ERF, so that the operation of the driving device had been to be gradually decelerated with a lapse of time.

The present inventors have analyzed this phenomenon, and reached such an idea that it is important to practically adopt the operation for blocking a supply energy to a driving device which had been neglected in the conventional control method, as a novel control method for controlling the motion of a movable part of a machine.

There will be described hereinafter in detail a positioning control with high precision in a driving device (actuator) adopting an ERF, according to the embodiment of the present invention.

In this embodiment, there is adopted a counter rotation driving type ER actuator (hereinafter simply referred to as "ER actuator") shown in FIG. 1.

In FIG. 1, an upper driving drum (driving cylinder) 5 and a lower driving drum (driving cylinder) 6 are driven to rotate about an X-axis in the directions opposite to each other at the same speed, such as via a motor 1, a variety of friction wheels (or gears) 2, and wrapping transmission mediums 3 and 4. Provided inside these drums 5 and 6 is an output drum (output cylinder) 7 which is supported rotatably about the X-axis, independently of the above rotating members.

It is noted that the upper driving drum (driving cylinder) 5 or lower driving drum (driving cylinder) 6 corresponds to first or second driving part according to the present invention, respectively.

Fixed to the output drum 7 is an arm 8, which is extended in a direction perpendicular to the X-axis, and adapted to rotate about the X-axis interlockedly with the output drum 7.

Figure 2:
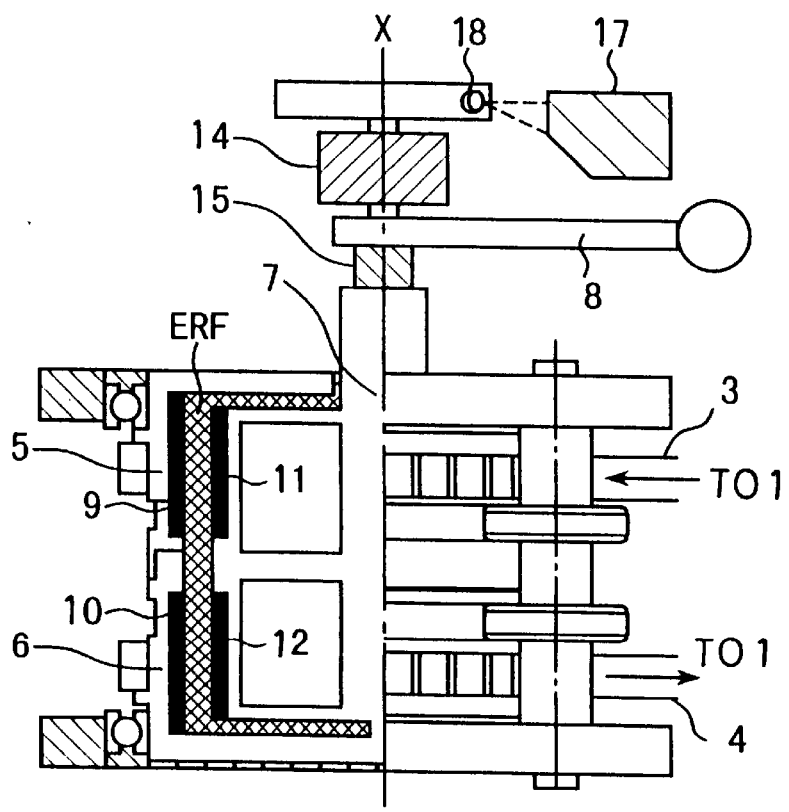
FIG. 2 is a constitutional view of a counter rotation driving type ER actuator according to the above embodiment.

Meanwhile, as shown in FIG. 2, electrodes 9 through 12 are fixed to inner walls of upper driving drum 5 and lower driving drum 6, and to an outer wall of output drum 7, respectively, and an ERF is filled between the inner walls of upper and lower driving drums 5, 6 and the outer wall of the output drum 7.

The output drum 7 (arm 8) can be rotated in a desired direction with a predetermined torque output, by controlling an electric field between the above electrodes to thereby vary a delivered torque (shearing stress) of the ERF.

Namely, when a predetermined electric field is generated between the electrodes 9 and 11 without generating any electric field between the electrodes 10 and 12, the output drum 7 thus the arm 8 is rotated to follow the upper driving drum 5 by virtue of the delivered torque (shearing stress) of the ERF.

Conversely, when a predetermined electric field is generated between the electrodes 10 and 12 without generating any electric field between the electrodes 9 and 11, the output drum 7 thus the arm 8 is rotated to follow the lower driving drum 6 by virtue of the delivered torque (shearing stress) of the ERF.

The positioning control according to the present invention is performed by a computer 13, which takes in an output of an angle detection sensor 14 at intervals of a sampling time such as 1 ms, and also takes in an output of a torque sensor 15.

The computer 13 outputs a control signal which is inputted into a high-voltage supply 16 connected to the motor 1 and electrodes 9 through 12, so that the computer 13 can variably control a driving speed of the motor 1, and rotational direction and torque output of the output drum 7 thus of the arm 8.

In the above, detection of angular position of the output drum 7 thus of the arm 8 (output shaft) is effected by using both of a wide range potentiometer (sensor 14) and a laser displacement meter 17 for high precision positioning (output of the laser displacement meter 17 is also taken in by the computer 13).

In this case, the laser displacement meter 17 is adapted to detect a position of a projecting part 18 (see FIGS. 1 and 2) provided on a disc plate on the output shaft, making use of a procedure to convert a deviation from a target angle based on a measured linear displacement.

Figure 3:
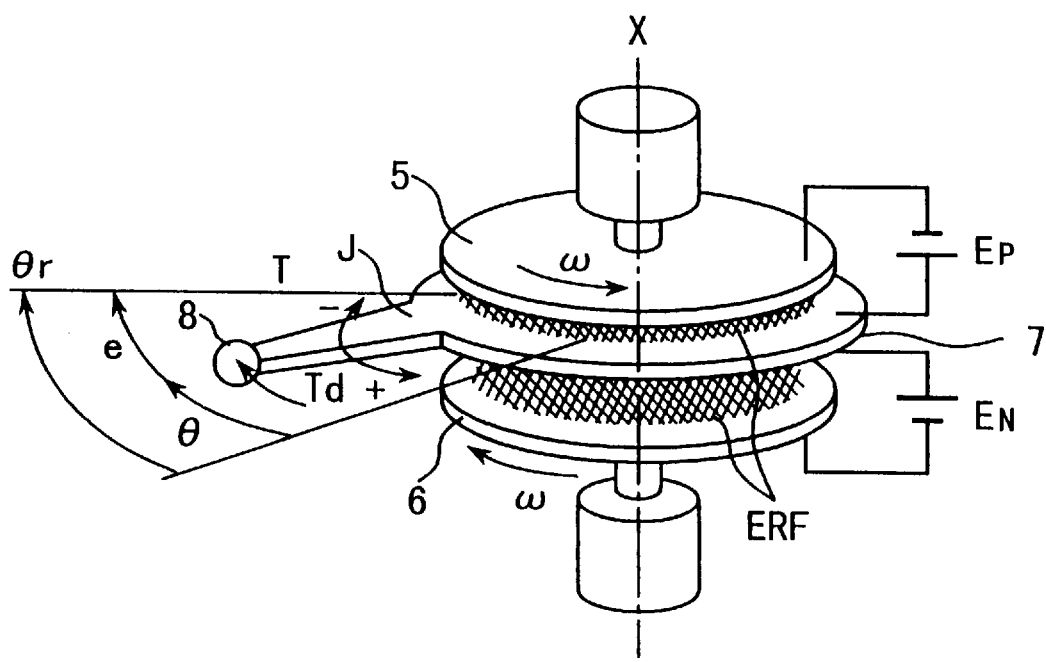
FIG. 3 is a view showing a motion model of the counter rotation driving type ER actuator according to the above embodiment.

FIG. 3 shows an operation model of the ER actuator, in which the drums 5 through 7 are replaced by disc plates.

It is supposed here, J is a moment of inertia, $\theta$ is an output shaft angle, $\omega$ is an angular velocity of the driving cylinder, $E_p$ is an electric field applied between the positive direction cylinder and the output cylinder, $E_N$ is an electric field applied between the negative direction cylinder and the output cylinder, and $T_d$ is a disturbance torque.

Further, a static torque output T of an ER actuator is represented by the following equation (5):

$$T = AR\{\tau_E(E_p) \cdot sgn(\omega-\dot{\theta}) + \tau_E(E_N) \cdot sgn(-\omega-\dot{\theta}) - 2B\dot{\theta}\} \quad (5)$$

wherein A is a surface area of electrode, R is a radius of the output cylinder, and B is a damper coefficient.

If neglecting a response delay of the induced yield stress $\tau_E(E)$, an equation of motion for the output cylinder can be given by the following equation (6):

$$J\ddot{\theta} = T_{ER}(E_P) \cdot sgn(\omega-\dot{\theta}) - T_{ER}(E_N) \cdot sgn(\omega+\dot{\theta}) - 2ARB\dot{\theta} + T_d \quad (6)$$

wherein $T_{ER}(E) = AR \tau_E(E)$.

Figure 4:
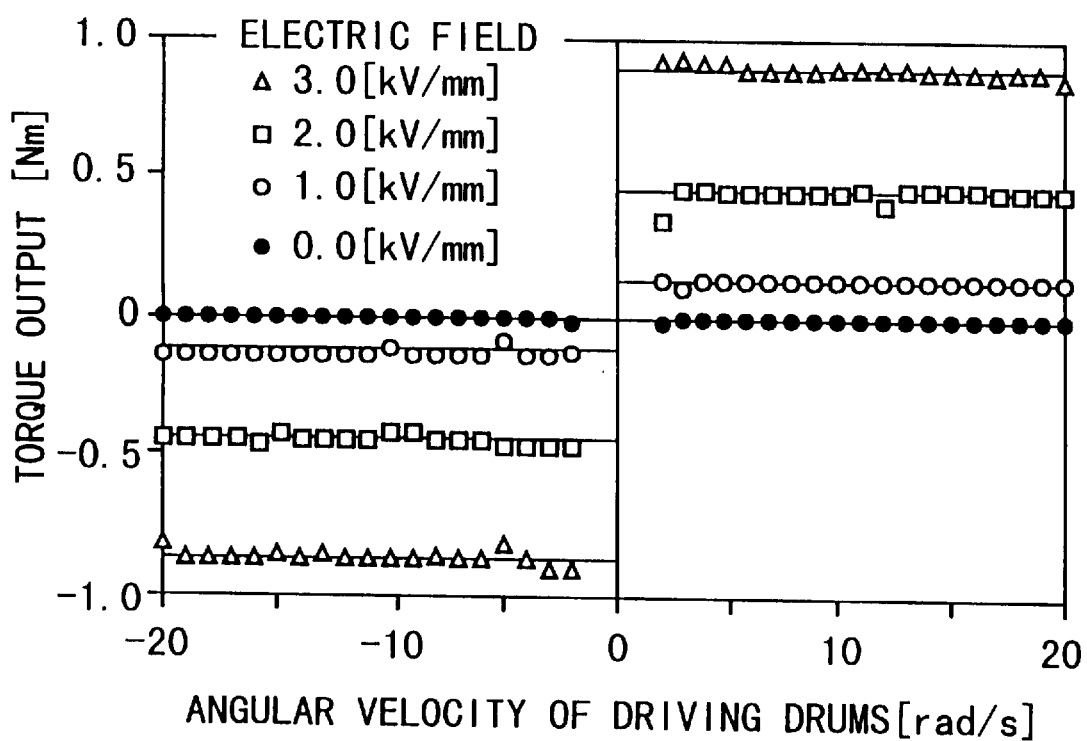
FIG. 4 is a graph showing a measured result of a torque output relative to a rotational speed of a driving cylinder.

FIG. 4 shows a result of a torque output which is measured by such a procedure that a constant voltage is applied to either between positive direction side electrodes or between negative direction side electrodes, under a situation that the output shaft (arm 8) is mechanically fixed.

From this figure, it can be understood that the torque output is determined by a magnitude of an electric field only, without depending on the angular velocity of the driving cylinders.

Figure 5:
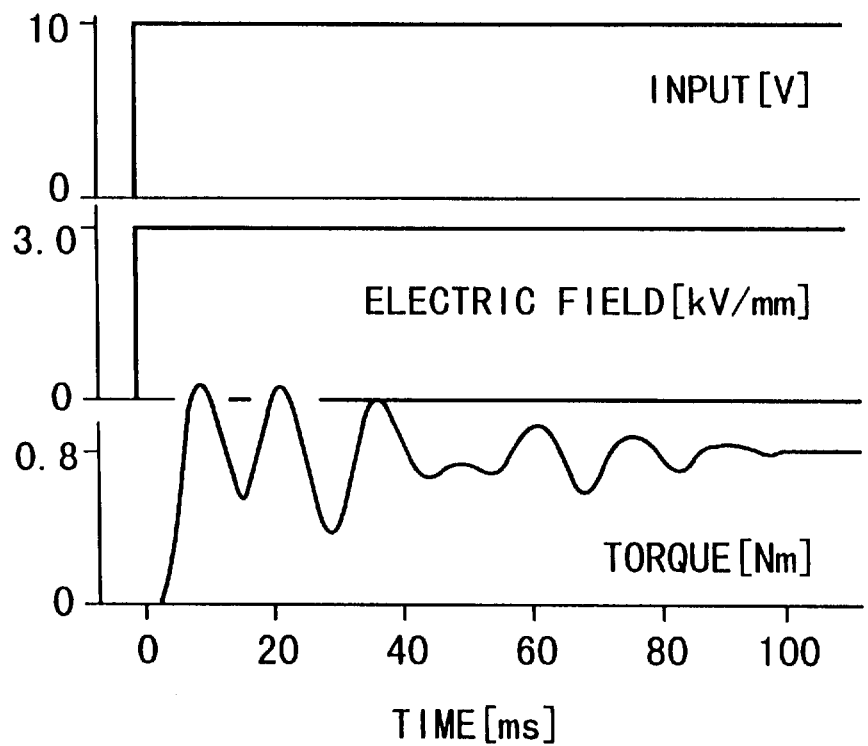
FIG. 5 is a graph showing a measured result of a torque response characteristic relative to a stepped input.

FIG. 5 shows a response of torque output relative to a stepped input of an electric field of 3.0 kV/mm. Also from this figure, it can be understood that the torque response characteristic is high, since the characteristics of ERF are reflected.

Only, the reason why the waveform of the torque output is vibratory would be that the dynamic characteristics such as of the output cylinder and couplings have been superimposed on the dynamic characteristics of the torque change.

Meanwhile, in the present embodiment, there is adopted a switching control method in which electric fields $E_P$ and $E_N$ are switched for the deviation e (=$\theta_r-\theta$) relative to a target angle $\theta_r$, as represented by the equations (7):

$$e \geq 0: E_P = E_C, E_N = 0$$
$$e < 0: E_P = 0, E_N = E_C \quad (7)$$

wherein $E_C$ is an arbitrary constant electric field.

However, according to this simple switching control method, the acceleration torque is not decreased even at the time of reaching the vicinity of the target position. As such, if the aforementioned switching control is performed under a condition that the angular velocities of the driving drums 5 and 6 are constant, there will occur a vibration motion (limit cycle) about the target angle.

Considering based on a linear control theory, there could be adopted a procedure to adjust a magnitude of electric field corresponding to deviation and speed to thereby avoid the aforementioned limit cycle. However, this results in complication of control method.

Then, there has been conducted a control experiment to identify parameters dominating the amplitude α of limit cycle, with variously changing the magnitudes of the electric field $E_C$ and angular velocity ω.

Figure 6:
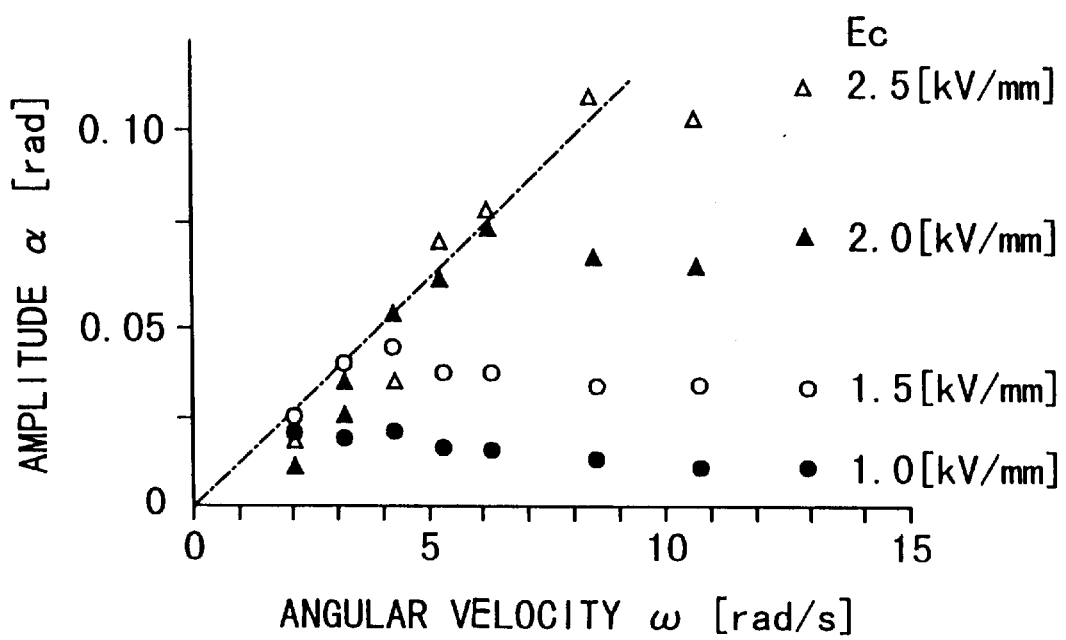
FIG. 6 is a graph showing a relationship among an electric field $E_C$, a rotational speed $\omega$ and an amplitude $\alpha$.

There have become apparent the following relationship, based on the experimental result shown in FIG. 6:

a) when the angular velocity ω is smaller than a specific value corresponding to the electric field $E_C$, the amplitude α uniformly decreases as the angular velocity ω decreases; and b) when the angular velocity ω is larger than the aforementioned specific value, the amplitude α becomes a constant value corresponding to the value of electric field $E_C$.

In view of them, the present inventors have narrowly thought up the following control method.

Namely, the aforementioned switching control is performed, in such a manner that the driving drums 5 and 6 are decelerated and stopped while continuing the switching control, at the time the output drum 7 (arm 8) has reached the target position or at the time of failing the target position.

Figure 7:
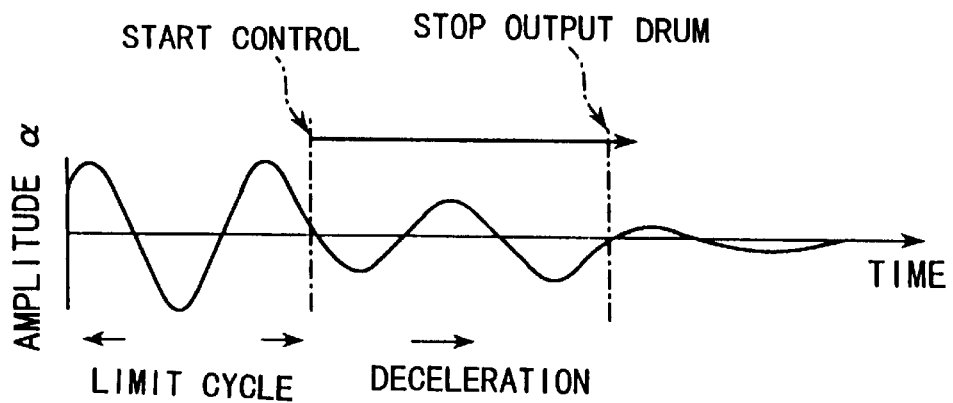
FIG. 7 is a time-chart showing a transition of the amplitude $\alpha$ by a control according to the above embodiment.

According to this way, as shown in FIG. 7, the limit cycle converges with the deceleration of the output drum 7 (arm 8), and the amplitude α becomes 0 at the time the output drum 7 (arm 8) has stopped, thereby enabling positioning with extremely high precision.

Namely, according to the control method of this embodiment, the vibration is attenuated smoothly with the deceleration of the driving drums 5 and 6 thus of the output drum 7 (arm 8), thereby enabling stable positioning with high precision.

The averaged error relative to the target position was within 10 μm (±0.01 deg. in terms of angle), as a result of several trials. From this result, in view of the fact that the laser displacement meter 17 has an effective resolution of 2 μm, it can be said that a positioning control with a remarkably high precision can be performed even by an extremely simple switching control.

Further, according to the control method of this embodiment, it is possible to apply an electric field to the ERF, even while the driving drum 5 (or 6) is stopped. Thus, it becomes possible to render a predetermined damping force (induced yield stress corresponding to the applied electric field) to act on the output drum 7 (arm 8), even while this output drum 7 (arm 8) is kept at the target position.

Therefore, there can be avoided such a situation that the limit cycle occurs again such as due to disturbance. Thus, there can be attained extremely stable positioning with high precision.

Namely, according to this embodiment, there is enabled extremely stable positioning with high precision by extremely simple switching control, which was not attained such as by the conventional ON/OFF control or proportional-integral control.

If it is intended to have priority of the convergence into the target position, it is possible to control to decrease the applied electric field (i.e., to decrease the induced yield stress) upon reaching the target position or upon failing the target position, to thereby suppress the amplitude α to a small extent.

Further, if it is intended to enhance a holding force at the time of holding the target position, it is possible to control to enhance the applied electric field (i.e., to increase the induced yield stress), at the time of holding the target position.

Figure 8:
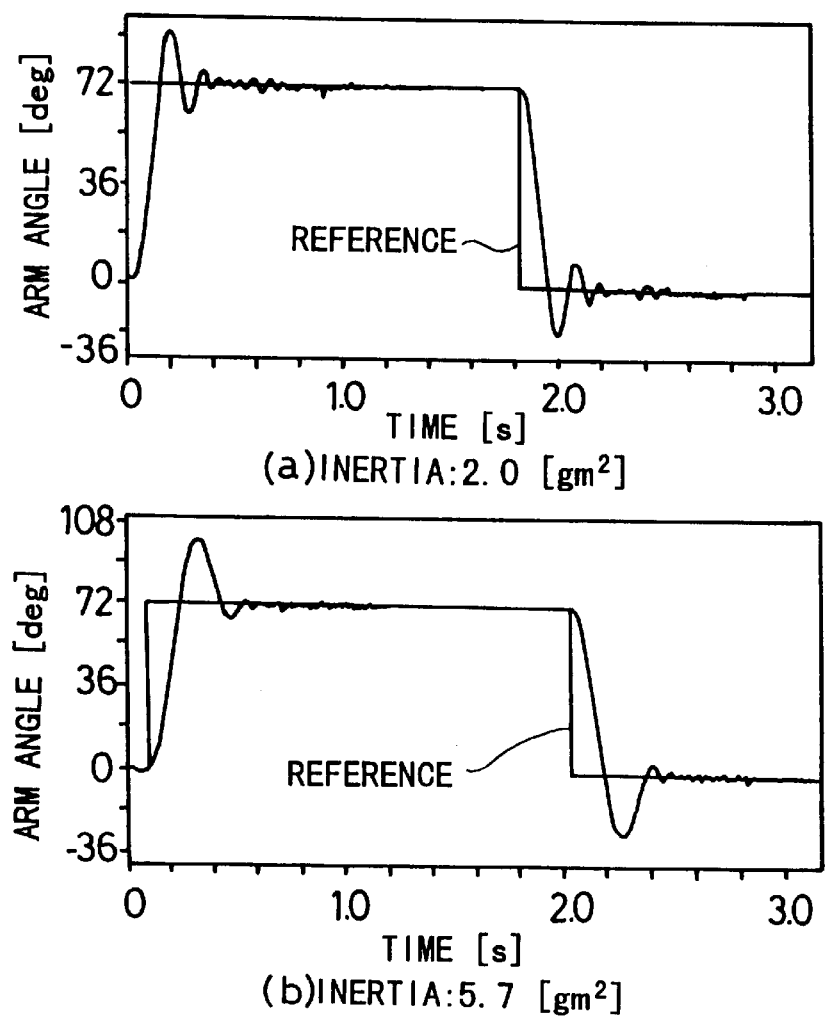
FIG. 8 is a graph showing a relationship between moment of inertia and stopping precision.

With reference now to FIG. 8, there will be considered the stopping precision in case that the inertia of the output shaft is changed. In FIGS. 8(a) and 8(b), the moment of inertia J is set at J=2.0 [g m²] and J=5.7 [g m²], respectively.

From FIG. 8, it can be understood that the precision is maintained even when the moment of inertia J of output shaft is changed. Further, although the displacement amount is set at 72 deg. here, it has been confirmed that the precision is not affected even when the displacement amount is increased.

There will be now considered hereinafter a relationship between the torque output T and the deviation e, under a situation that the disturbance torque $T_d$ varies, with reference to FIG. 9.

Figure 9:
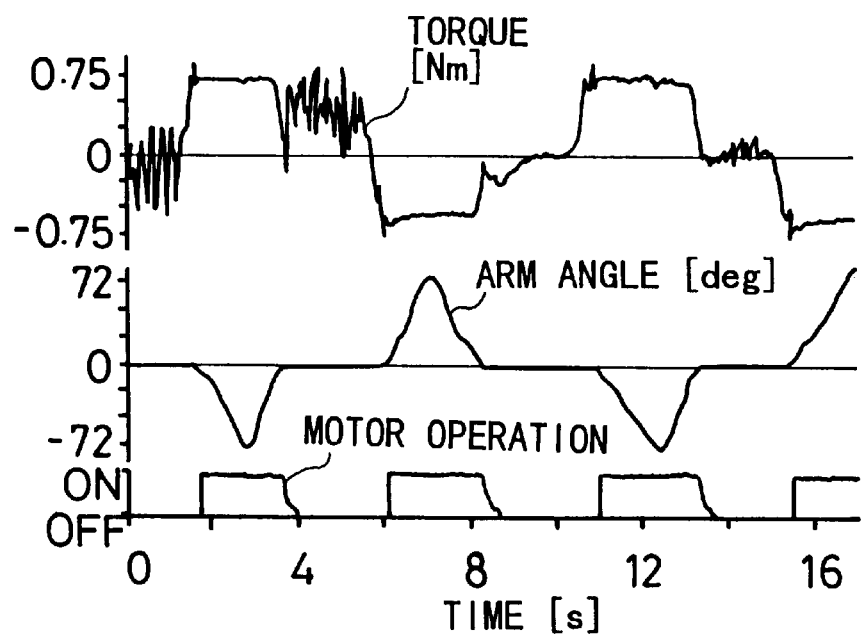
FIG. 9 is a graph showing a relationship of a torque output and a deviation relative to a variation of disturbance torque.

From FIG. 9, it is understood that high-precision positioning is attained under a condition that the disturbance torque $T_d$ is small, and that the position can be maintained. It is also confirmed that when the disturbance torque $T_d$ has increased and exceeded a limit value, the torque output T is kept at a constant irrespectively of the magnitude of the deviation e.

There will be explained hereinafter a principle of the aforementioned positioning control.

Theoretically, the control method according to the present embodiment comprises the step of repeating the following four operations, until the deviation becomes sufficiently small:

1) detecting the sign (positive or negative) of the deviation;
2) accelerating the output drum 7 in the target direction (i.e., applying an electric field to ERF);
3) switching the torque direction upon reaching the target position, i.e., switching the electric field to be applied to the ERF such that the output drum 7 will progress to a direction opposite to the previous progressing direction upon reversal of the sign of the deviation; and
4) stopping the output drum 7, and reverting to the step 1).

This repetition of four steps shall be defined as one cycle herein.

Since the magnitude of the applied electric field is constant irrespectively of the deviation or speed, the acceleration torque at the operation 2) and the damping torque at the operation 4) are both constant.

Then, the deviation e at each cycle is a damping distance required for performing the operation 4).

Therefore, by neglecting the disturbance torque $T_d$ and damping coefficient B in the equation (6), the deviation e at each cycle can be given by the following equation (8):

$$|e_i| \leq [J\theta_{(e=0)i}^2]/[2T_{ER}(E_C)] (i=1, 2, \ldots n) \qquad (8)$$

wherein $\theta_{(e=0)}$ is an angular velocity of the output drum upon passing the target angle. Since the torque $T_{ER}(E_C)$ is constant irrespectively of $\theta$, the deviation e is simply defined by $\theta_{(e=0)}$.

However, in case that the switching operation of the aforementioned equation (7) is being performed while maintaining the rotational speed of the driving drum 5 (or 6) at a constant value, the kinetic energy of the output drum 7 (arm 8) at each cycle can be given by the following equation (9):

$$(J/2)\theta_{(e=0)i}^2 = T_{ER}(E_C) \cdot |e_{i-1}| \qquad (9).$$

In this case, it could not be expected that the damping distance (i.e., the deviation at the end of cycle) decreases to a value smaller than the acceleration distance (i.e., the deviation at the beginning of cycle), so that a state where the deviation is maintained (limit cycle) will occur even if such switching operations are repeated many times.

However, as apparent from the equation (6), the output drum 7 (arm 8) is not capable of rotating at a speed faster than the angular velocity $\omega$ of the driving drum 5 (or 6). Thus, practically, the relationship of the aforementioned equation (8) is represented by the following equation (10):

$$(J/2)\theta_{(e=0)i}^2 \leq (J/2)\omega^2 \qquad (10).$$

This is realized by the Bingham fluid characteristic of ERF. Namely, when the speed of the output drum 7 (arm 8) is about to exceed the speed of the driving drum 5 (or 6), the delivered torque of ERF immediately acts to decelerate the velocity of the output drum 7 (arm 8), so that an excessive kinetic energy is thermally dissipated.

At the stopping process of the driving drum 5 (or 6), in case of adopting the method of repeating the operation cycles, $\omega$ decreases with the time lapse, so that the kinetic energy of the output drum 7 (arm 8) also decreases as represented by the following equation (11):

$$J\omega_{(e=0)i}^2/2T_{ER}(E_C) = \kappa_{i-1}[J\omega_{(e=0)i-1}^2]/2T_{ER}(E_C) \; (i=1,2,\ldots,n) \quad (11).$$

wherein $K_i$ is a variable representing a degree of decrease of a kinetic energy of the arm. Apparently from the second law of thermodynamics, $0 < K_i < 1$ for all $K_i$'s.

Assuming an initial deviation at the control starting time be $e_0$ in case that all $K_i$'s are equally constant, the deviation e after execution of n times of operation cycles can be given by the following equation (12):

$$|e_n| \leq J\omega_n^2/2T_{ER}(E_C) = J\kappa\omega_{n-1}^2/2T_{ER}(E_C) = J\kappa\cdot\kappa\omega_{n-2}^2/2T_{ER}(E_C) = \ldots = J\kappa^{n-1}\omega_1^2/2T_{ER}(E_C) \leq \kappa^{n-1}|e_0| \qquad (12).$$

Figure 10:
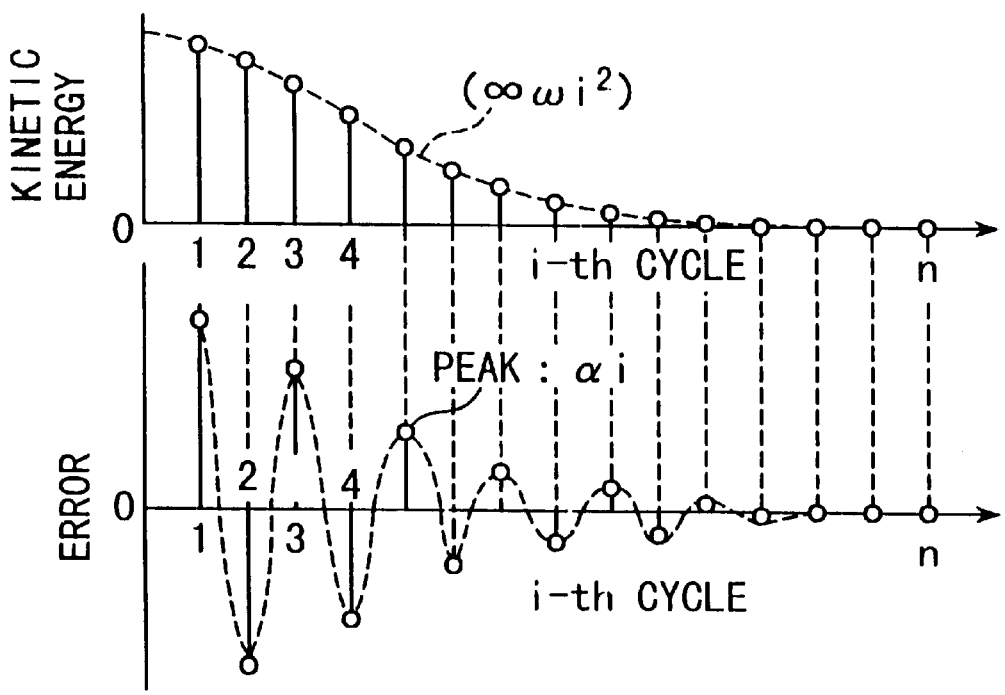
FIG. 10 is a diagram for explaining an attenuation pattern in a limit cycle.

FIG. 10 shows that the deviation $e_i$ (i.e., damping distance) does not depend on the previous deviation $e_{i-1}$ (i.e., acceleration distance), but the deviation $e_i$ is determined one by one simply by the angular velocity of the driving drum 5 (or 6) which decreases with the increase of i.

Since the speed of the driving drum 5 (or 6) at the control starting time has a finite magnitude, theoretically $n \to \infty$ in the course of $\omega \to 0$ so that the deviation $e_n$ approaches 0 unlimitedly.

Further, considering the influence of the fluctuation of inertia $\Delta J$ and the disturbance torque $T_d$, and assuming that K is not constant, the deviation $e_n$ is then given by the following equation (13):

$$|e_n| \leq \prod_{i=1}^{n} K^{i-1} \cdot \frac{(J+\Delta J) \cdot \omega_1^2}{2(T_{ER(E_c)} - T_d)} \leq \prod_{i=1}^{n} K^{i-1} \cdot |e_0|. \qquad (13)$$

At least, the above equation (13) is established if $|T_d| < T_{ER}(E_C)$, and if $n \to \infty$, the deviation $e_n$ becomes 0 without depending on changes of $T_d$ and J.

Practically, n is cut off by finite times due to such a reason that the execution of the operation 3) includes a delay which cannot be neglected and that the degrees of speed decrease of the upper and lower driving drums 5 and 6 are different from each other. Thus, there is generated a finite deviation $e_n$ for a finite n.

Nonetheless, it has been confirmed from an experimental result that a steady-state deviation becomes sufficiently small, such as since the shearing stress of ERF is substantially constant irrespectively of the shear rate, and since the change of shearing stress is possible to respond rapidly.

If the characteristic of the control method according to the present embodiment is to be explained persistently within a category of a linear control theory, it is possible to express that the apparent rigidity of the system, i.e., the servo gain, increases in the course of $\omega \to 0$, and reaches an infinite when $\omega = 0$.

If this is to be expressed by an apparent rigidity $K_{ER}$, the following equation (14) is given:

$$K_{ER(s)} = \frac{T_{ER}(E_c) \cdot \text{sgn}(e)}{e} = \frac{T_{ER}(E_c)}{|e|} \quad \therefore \lim_{e \to 0} K_{ER} = \infty \quad (14)$$

In case that $|T_d| < T_{ER}(E_C)$, $e \to 0$ when $\omega \to 0$. Thus, $K_{ER}$ increases toward an infinite. However, such an infinite gain is not realized in a general servo system due to a problem of stability of the system. This problem is solved as follows.

In the present control method, the magnitude of operation torque $T_{ER}(E_C)$ at the i-th cycle is constant during the period of time of this cycle. This $T_{ER}(E_C)$ can be expressed as follows, by using the apparent rigidity $K_{ER}$ and the apparent viscosity $B_{ER}$:

$$T_{ER}(E_C)_i = K_{ERi} \cdot e_i = B_{ERi} \cdot \omega_i \quad (15)$$

It should be noted here that each of $B_{ER}$ and $K_{ER}$ is realized by the apparent viscosity coefficient $\eta(E)$.

Thus, when $\omega \to 0$, each of $B_{ER}$ and $K_{ER}$ increases to an infinite.

That is:

$$\lim_{\omega_i \to 0} B_{ER} = \infty \quad \text{and} \quad (16.1)$$

$$\lim_{e_i \to 0} K_{ER} = \infty \quad (16.2)$$

Namely, as the apparent rigidity $K_{ER}$ increases to an infinite, the apparent viscosity $B_{ER}$ also increases to an infinite. Thus, it is thought that a remarkably high-precision positioning can be robustly and stably executed.

The second embodiment according to the present invention is to conduct a low-speed control of a pneumatic cylinder, making use of the characteristic of ERF.

Conventionally, pneumatic cylinders have possessed superior features such as a large output/weight ratio which other actuators do not have. Contrary, it has been difficult to conduct a low-speed control of a pneumatic cylinder, since a frictional vibration, i.e., so-called stick-slip, is caused due to an influence of a non-linear frictional force at a seal part of the cylinder,.

Namely, since a dynamic frictional force be smaller than a static frictional force, a body (piston) which has been stationary, once started to move, has to be accelerated into a so-called running away state. As such, when it is intended to conduct a low-speed control, there will occur a so-called stick-slip state in which the running away state and a stationary state occur alternatingly. Particularly, a pneumatic cylinder has a remarkable reduction characteristic (non-linearity) of a frictional force just after starting of movement, so that it has been difficult to control its motion in a low speed range.

In this embodiment, there is constituted a damper utilizing ERF (referred to as ER damper hereinafter) to be connected to a rod of a double-acting pneumatic cylinder, in order to enable a low-speed control of the pneumatic cylinder making use of the characteristic of ERF.

Figure 11:
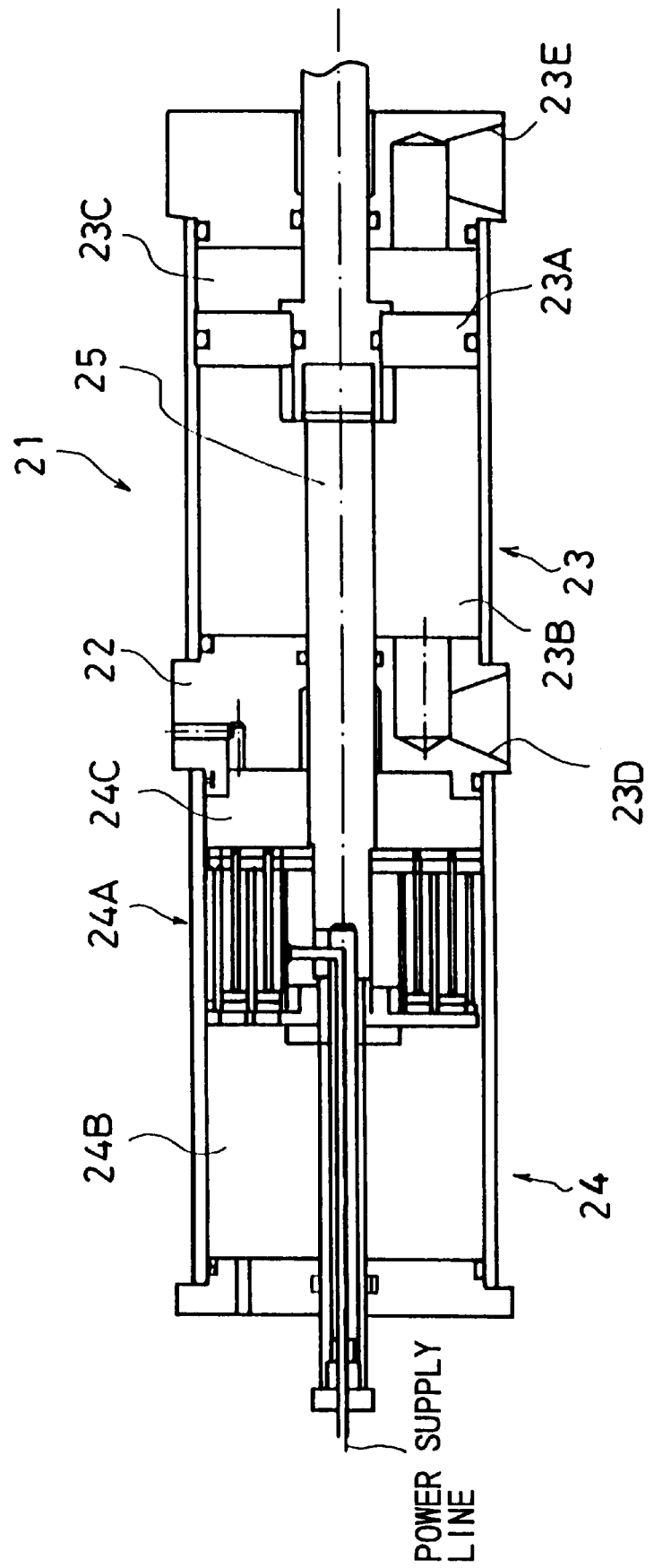
FIG. 11 is a longitudinal sectional view of a pneumatic actuator according to a second embodiment of the present invention.

Concretely, as shown in FIG. 11, there is provided a double-acting pneumatic cylinder 21 formed with a double-acting pneumatic cylinder part 23 and an ER damper part 24 at the right and left sides of this figure, respectively, to interpose therebetween a block 22 substantially at the center.

The double-acting pneumatic cylinder part 23 is reciprocally movably inserted with a piston 23A which is held to define a cylinder chamber 23B and a cylinder chamber 23C (for example, piston diameter and stroke are supposed to be about 50 mm and 50 mm, respectively).

This piston 23A is fixed to a rod 25 (movable part) for taking out an output from the double-acting pneumatic cylinder 21.

It is noted that the inner pressures of the cylinder chambers 23B and 23C are controlled by a feeding/discharging air rate control effected by a flow control valve connected to these chambers via air passages 23D and 23E.

By this constitution, the piston 23A thus rod 25 can be moved to a target position.

Meanwhile, the ER damper part 24 is interiorly filled with ERF, and is reciprocally movably inserted with a damper piston 24A which is held to be fixed to the rod 25.

Figure 12:
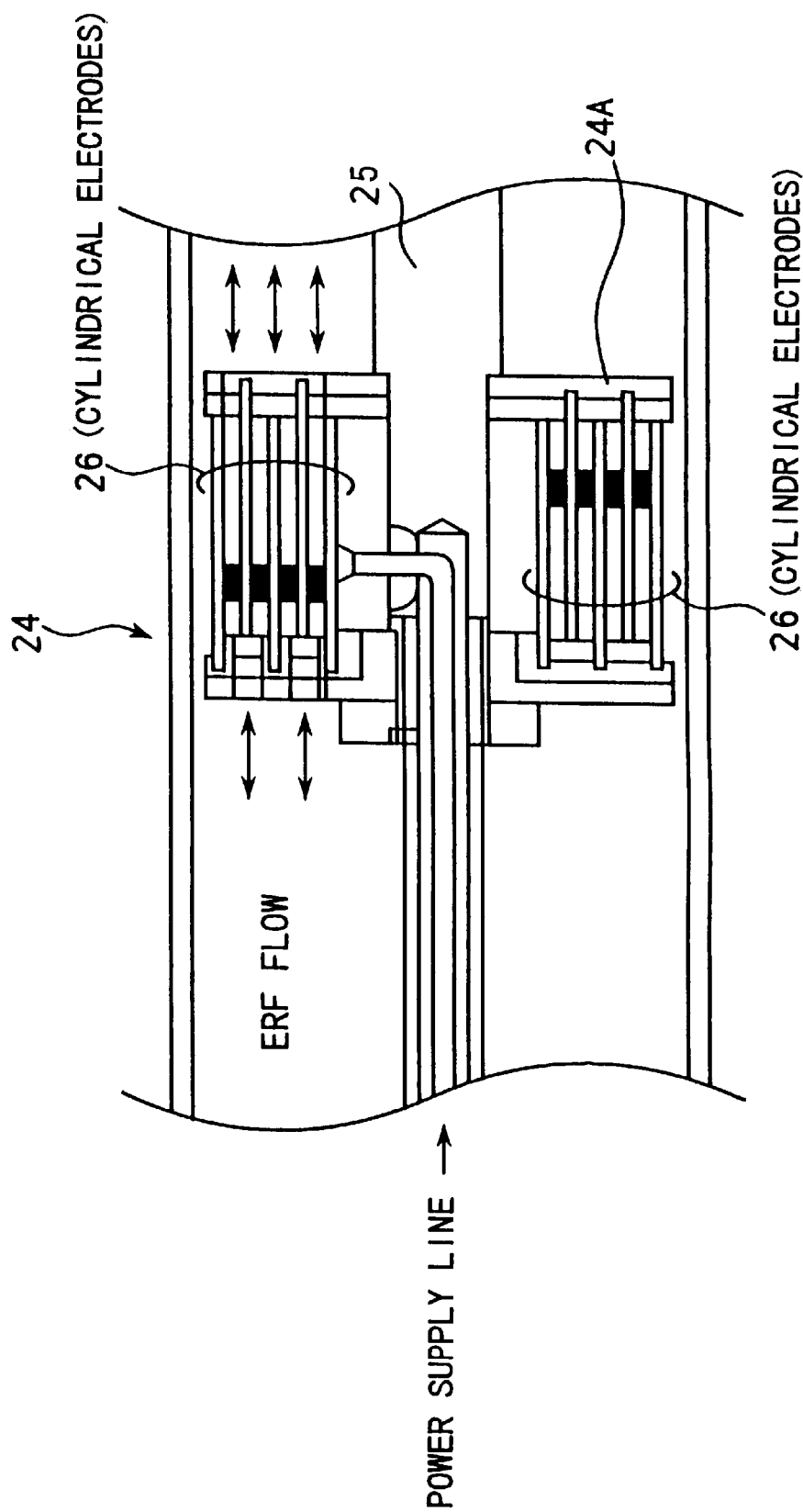
FIG. 12 is an enlarged sectional view of an ER damper portion of the second embodiment.

As shown in FIG. 12, this damper piston 24A is provided with a plurality of concentric cylindrical electrodes 26 in an alternating manner of positive and negative electrodes, such as by five layers with respective gaps of about 2 mm.

Upon movement of the damper piston 24A with the movement of the piston 23A thus of the rod 25, the ERF flows through the gaps between the electrodes of the damper piston 24A.

At this time, the moving speed (moving resistance) of the rod 25 is controlled, making use of change of the fluid characteristics of ERF by an electric field applied between the electrodes.

In a conventional damper adopting a viscous fluid, it has been impossible to generate a sufficient damping force (shearing stress) which can compensate decrease of a frictional force due to transition from a static frictional state to a dynamic frictional state, within a range where the piston moving speed (moving speed of rod 25; shear rate) is extremely low (inclusive of zero). As such, there is occurred a so-called running away state, making it difficult to conduct a low-speed control.

Notwithstanding the above, it is possible to compensate the decrease of the aforementioned frictional force, when making use of the fluid characteristics of ERF, i.e., such a characteristic which exhibits a substantially constant shearing stress irrespectively of a shear rate (in other words, such a characteristic which exhibits a finite shearing stress (damping force) corresponding to a magnitude of an applied electric field even when the shear rate is 0 (zero)). It therefore becomes possible to conduct a low-speed control of the piston moving speed (moving speed of rod 25) with high precision.

Figure 13:
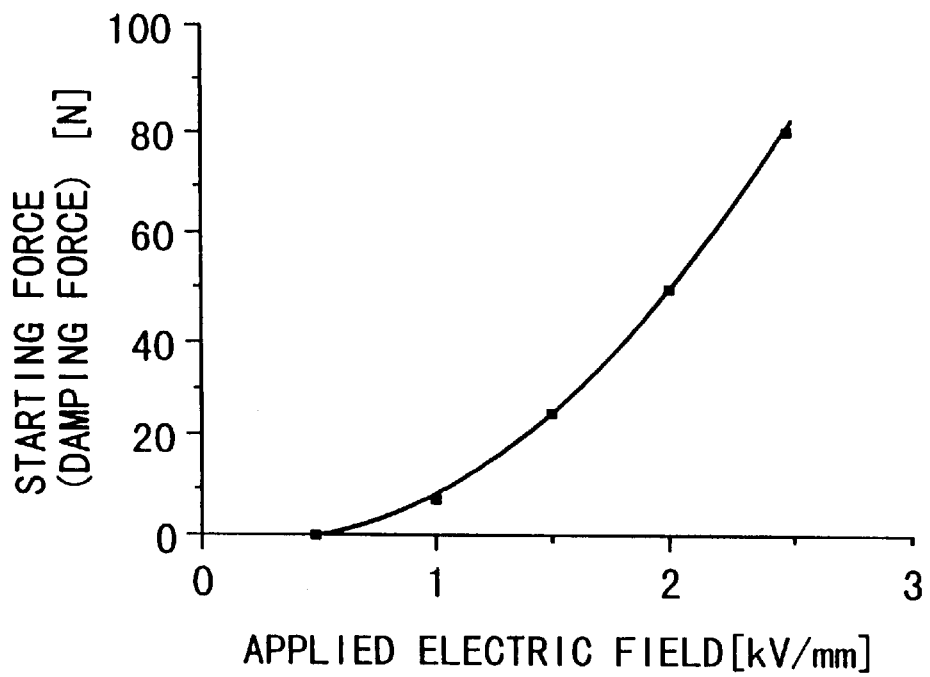
FIG. 13 is a graph showing a relationship between an applied electric field and a starting damping force according to the second embodiment.

FIG. 13 shows a result of an actually measured starting force required for starting movement (i.e., a damping force at the time the speed v=0) of the damper piston 24A in case of adopting ERF. There was obtained a damping force of 82.5 N at the time of application of an electric field of 2.5 kV/mm.

Figure 14:
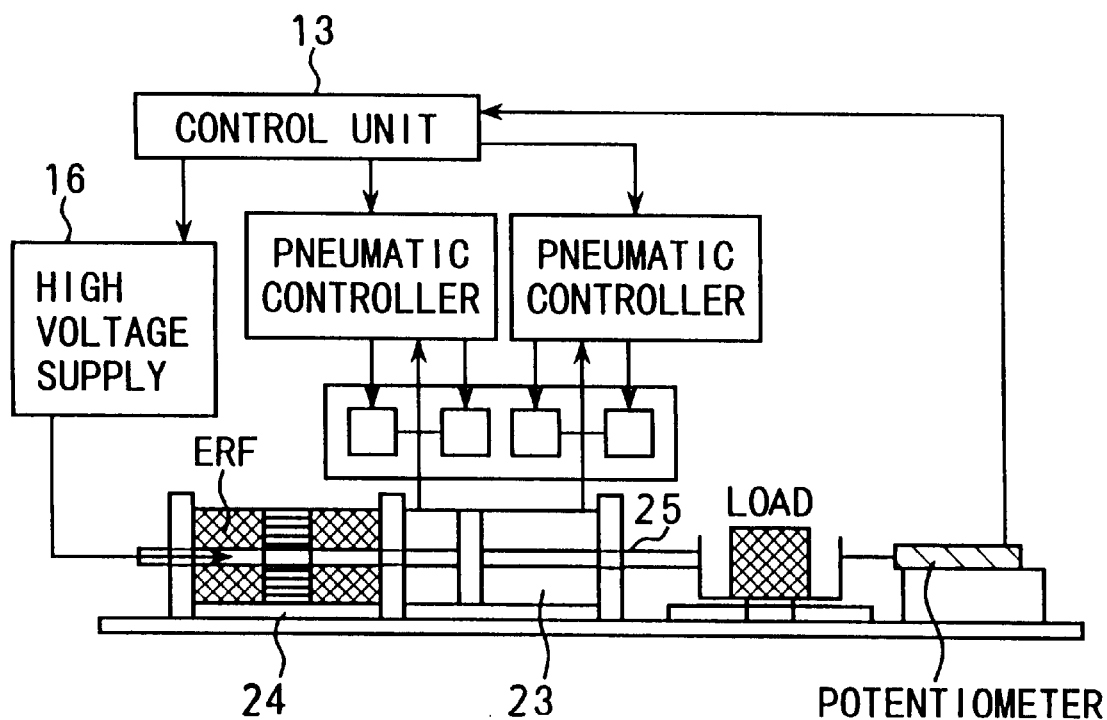
FIG. 14 is a schematic constitutional view explaining a control system according to the second embodiment.

There has been used herein an experimental apparatus such as shown in FIG. 14, and an ERF comprising a silicone oil suspended with crystallite cellulose particles.

There will be shown hereinafter a concrete compensation for decrease of a frictional force, and a low-speed control of the piston moving speed (moving speed of rod 25).

Figure 15:
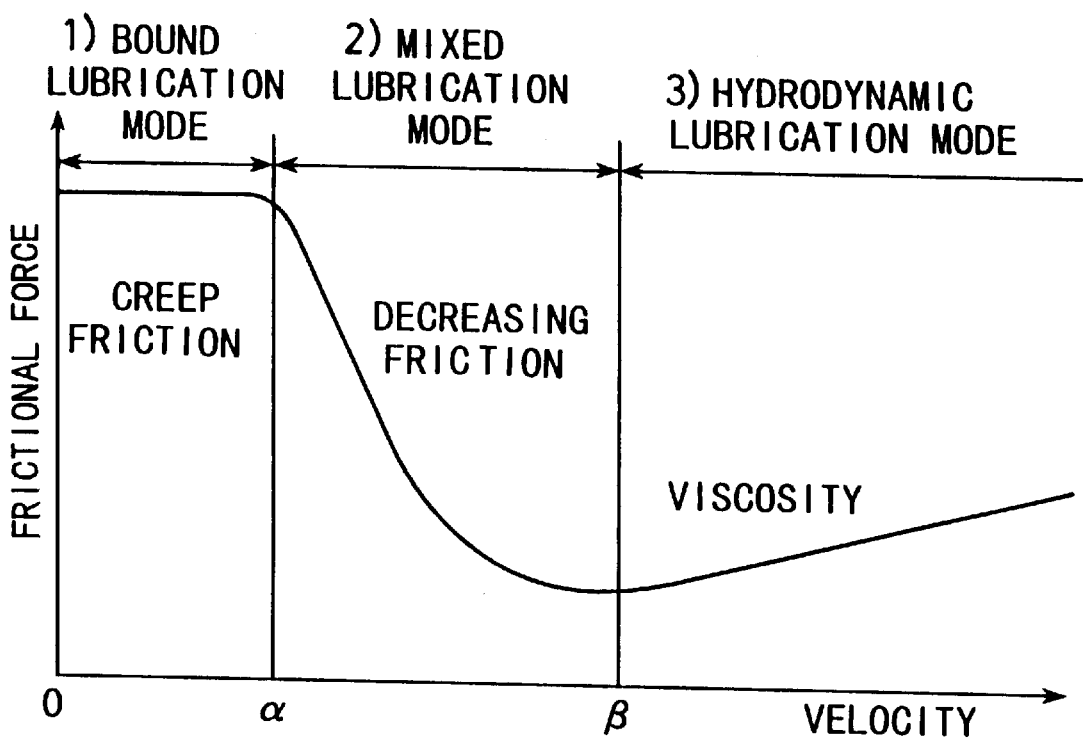
FIG. 15 is a graph showing a friction characteristic at a pneumatic cylinder portion.

Generally, the pneumatic cylinder part 23 has a friction characteristic which can be modelized by a Stribeck curve as shown in FIG. 15.

In this model, the characteristic of a frictional force has three lubrication modes corresponding to the velocity:
1) bound lubrication mode: a velocity range in which a static frictional force is kept; the frictional force is constant irrespectively of the velocity, so that an extremely low speed (inclusive of 0) motion can be realized;
2) mixed lubrication mode: a velocity range in which a non-linear friction characteristic is exhibited where the frictional force decreases from a static frictional force to a dynamic frictional force, with increase of the velocity; and 3) hydrodynamic lubrication mode: a velocity range in which a viscous force such as of a lubricant becomes dominant, so that the frictional force increases proportionally to the velocity.

Then, the problem to be noted here is that the gradient of the frictional force to the velocity is negative in the mixed lubrication mode 2).

If it is possible to generate a damping force (shearing stress) sufficient for compensating this decrease of the frictional force, the so-called running away state can be suppressed so that the low-speed control can be conducted.

Then, in this embodiment, the ERF is applied with an electric field corresponding to the velocity, such that the damping force generated by the ER damper part 24 (i.e., damping force of ER actuator) compensates the decrease of the frictional force so that the transition of mixed damping force continuously has a positive gradient (inclusive of zero).

Figure 16:
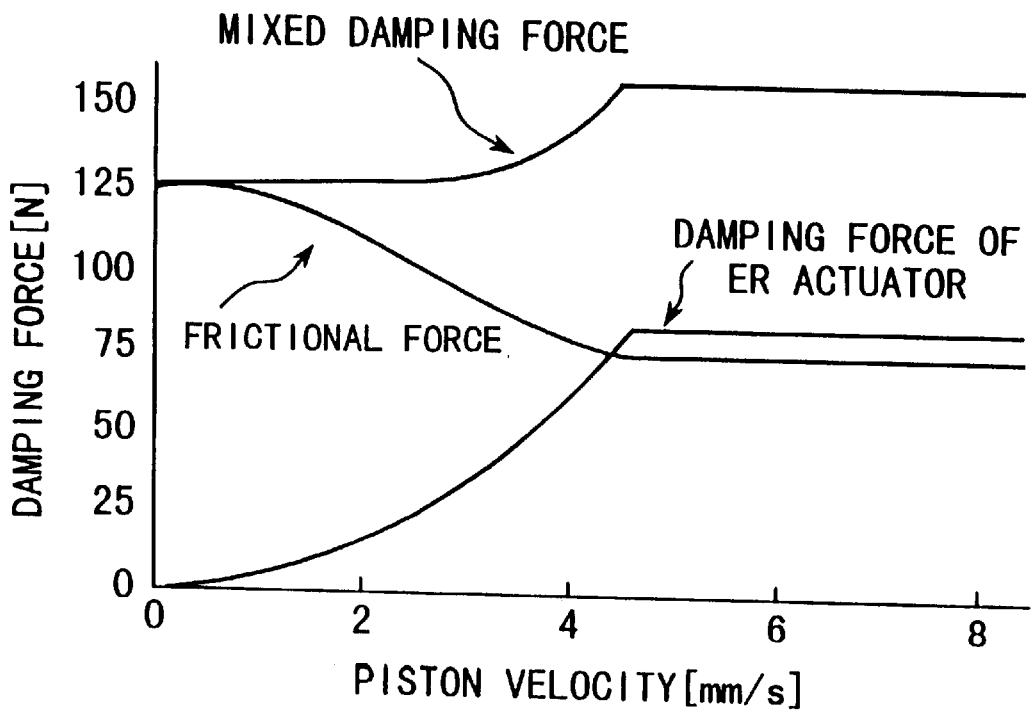
FIG. 16 is a graph explaining a mixed damping force (moving resistance) according to the second embodiment.

Namely, by controlling the electric field to be generated between the cylindrical electrodes 26, as shown in FIG. 16, the damping force (shearing stress) by virtue of the ERF (ER damper part 24) is increased correspondingly to the decrease of the frictional force due to the velocity increase just after starting of the piston. Further, the transition or gradient of the mixed damping force (i.e., moving resistance) to the piston velocity (moving speed of rod 25) is rendered to become always positive (inclusive of zero).

Such an electric field control (setting such as of a magnitude of applied electric field, how to vary the applied electric field, and the timings of application switching ($\alpha$ and $\beta$ in FIG. 15)) can be determined such as based on an experiment, or a result of a numerical calculation.

As described, by utilizing the variable dumper adopting ERF, it becomes possible to compensate the non-linear friction characteristic in the mixed lubrication mode 2), to thereby allow uniform transition of the moving resistance of the movable part relative to the increase of the piston velocity (moving speed of rod 25) while maintaining a change rate to be positive (inclusive of zero).

Therefore, it becomes possible to avoid a so-called running away state attributable to a sudden change of a frictional force of the movable part, to thereby suppress a so-called stick-slip, so as to conduct a stable low-speed control with high precision thus a positioning control with high precision to the target position of the rod 25.

Meantime, it has been common to apply an advanced modern control theory such as exemplified by an adaptive control, so as to accurately control a motion of a conventional pneumatic cylinder which does not adopt an ER damper. As such, there have been required such as a computer capable of high-speed calculation, and a control valve having high followability, which extremely deteriorates the advantage of the pneumatic actuator such as simplicity and low cost.

Contrary, according to the pneumatic actuator of the present embodiment, it becomes possible to conduct a velocity control and a positioning control with higher precision and more stable than the conventional, even with an extremely simple construction at lower cost.

In this embodiment, there has been described a double-acting pneumatic cylinder as an example. However, the present invention is not limited thereto, and can be applied such as to a single-acting pneumatic cylinder (having a single cylinder chamber) such as utilizing a reactive force of an elastic body, and even to a hydraulic cylinder without limited to a pneumatic one.

Namely, the present invention can be applied to any fluid-pressure actuator, thus to any movable parts of those machines having non-linear friction characteristics.

According to the present invention, it is possible to conduct a positioning control in a stable manner with high-precision even by an extremely simple constitution, and to maintain the target position with a predetermined damping force, thereby enabling constitution of a cooperative working control system, as follows.

Recently, there have been extensively researched a robot capable of coexisting with a human, such as an aged person assist supporting robot and a personal robot.

While the safety of an operator around the industrial robots has been ensured by isolating the former from the latter, the aforementioned coexisting robots have a basic prerequisite of contact with a human body, thereby requiring the guarantee of user's safety as an essential subject or purpose.

Namely, there is demanded a control method for realizing an objective operation while avoiding an excessive contact force generated when a coexistence robot conducts an operation involving contacting with a human body.

This control method for realizing a soft motion is called a compliance control.

Generally, in a compliance control, there is established adaptability of the robot, by lowering the servo gain of the system. Further, it has been believed that the safety degree is high as the gain is low, since the reactive force of a human body can be decreased even against a large deviation if the servo gain is small.

However, this method includes the following problems:
1) even if the reactive force to the human body is allowably small, it is impossible to conduct positioning to a target position with good precision;
2) the deviation varies even relative to an extremely small fluctuation of external force, disabling stable stoppage; and
3) when the deviation becomes extremely large, an excessive force might be ultimately exerted onto a human body.

Therefore, the present inventors have found out a novel control system, to solve the aforementioned problems.

Figure 17:
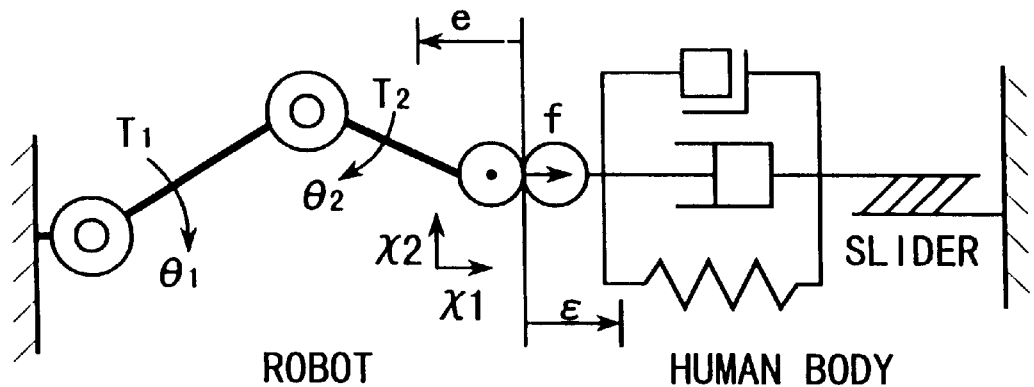
FIG. 17 is a model view of a coexistence robot.

This model is shown in FIG. 17.

In this figure, $T_1$ and $T_2$ are driving torques of a robot, $x_1$ and $x_2$ are the hand tip end position of the robot, f is an interference force generated between a human body and the robot, e is a deviation relative to a target, and $\epsilon$ is a displacement of the human body.

In a situation (cooperative working) where the human and the robot directly contact to interact with each other, it can be judged to be safety if the interference force exerted by the robot is within a range which does not exceed an allowable limit value for a contact force of the human body.

Thus, it can be said that a control characteristic of a robot for ensuring safety of a human should be such that: the positioning is to be performed by decreasing the deviation as small as possible when the interference force is lower than an allowable limit value; while suppressing the interference force to be smaller than the allowable limit value even when the deviation has increased, in a situation where the reactive force of the human body may become excessive.

Assuming an actuator output for correcting the deviation e to be T, then the ideal characteristic of a robot for satisfying this prerequisite can be expressed by the following equation (17):

$$T = T_{dmax} \cdot sgn(e) \quad (17)$$

wherein $T_{dmax}$ is an allowable limit value of the interference force allowed for the human body, and sgn(e) is a signum.

Figure 18:
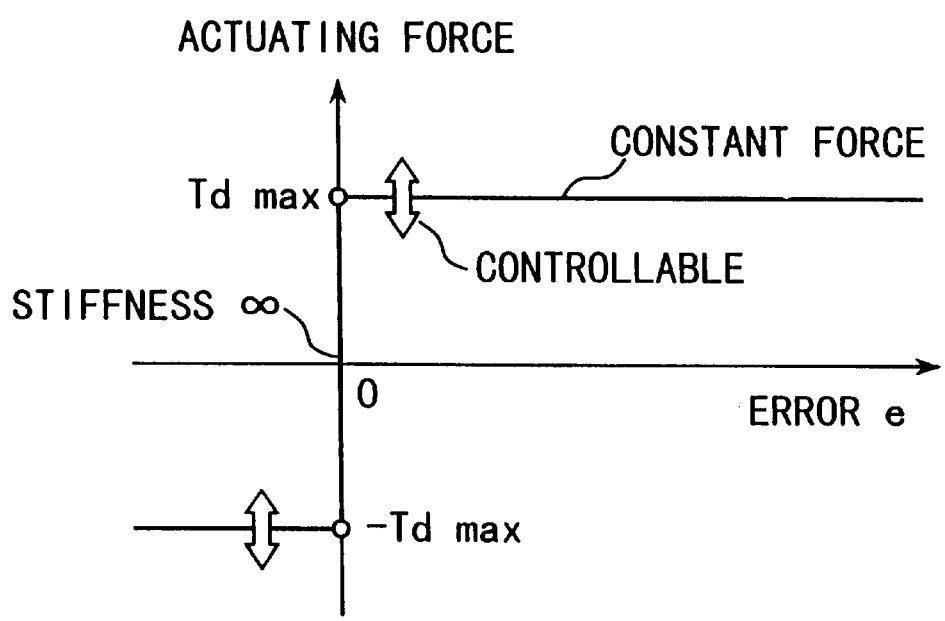
FIG. 18 is a graph explaining an ideal actuator output pattern.

FIG. 18 shows a pattern of this actuator output T.

This control characteristic is characterized in that a positioning control with high rigidity is performed at the target upon released from constraint of the human body, while an excessive interference force exceeding the allowable limit value of the human body is never caused.

As already discussed, when a servo system is constituted making use of a shearing stress of ERF, there can be established a holding state where an objective body does not generate any displacement against an external force equal to or smaller than a yield value, while the resisting force upon displacement of the objective body can be maintained within a certain allowable value.

For example, in case of constituting a cooperative working control system to include the aforementioned ER actuator, by performing an angular (positioning) control in a state where the human holds the arm 8, to thereby conduct a cooperative working (assistance), it becomes possible to transport the human body (hand) to a target position with high precision by a predetermined transportation torque (torque output of arm 8), and thereafter to stably hold it at this position.

Further, even when an interference force (contact force) larger than a predetermined output (torque output of arm 8) is generated (such as when the human intends to stop the arm 8 at an intermediate position), the output torque of the arm 8 never exceeds a shearing stress (yield stress) of ERF so that the arm 8 never exerts an excessive contact force onto the human body.

Thus, the contact force to the human body can be assuredly maintained at a value equal to or smaller than an allowable limit value (which is adjustable by the applied electric field).

Moreover, by constituting a cooperative working control system to include an actuator comprising the ER damper according to the present invention, the stable low-speed control of the movable part is possible, enabling avoidance of generation of a temporary excessive output due to stick-slip.

In addition, when controlling the fluid pressure acting on the movable part in consideration of the allowable limit value of the human body, the contact force to the human body can be assuredly maintained at a value equal to or smaller than the allowable limit value.

Therefore, it is possible to perform a predetermined working (such as positioning) with a predetermined output which does not exert an excessive force onto the human body by virtue of the rod 25, and thereafter to stably maintain the position.

Consequently, according to the control system of the present invention, it becomes possible, in a cooperative working, to perform a positioning control with high precision when the interference force is equal to or smaller than an allowable limit value, and to suppress the interference force to be equal to or smaller than the allowable limit value under a situation where the reactive force to the human body may become excessive, to thereby ensure the safety of a user.

Meanwhile, in the aforementioned embodiments, there have been presented examples adopting an ERF the fluid characteristics of which can be variably controlled by an applied electric field. However, the present invention is not limited thereto, and it is also possible to utilize a magnetic fluid the fluid characteristics of which can be variably controlled by a magnetic field.

Namely, such as a magnetic fluid can be considered to be included in the variable Bingham fluids according to the present invention.

As explained above, when constituting a driving part to include an ERF so as to control a movable part of a machine according to the present invention, it becomes possible to realize a high-precision positioning with high stability which had not been attained such as by conventional ON/OFF control and proportional-differential-integral control. Further, by constituting a damping or braking part to include an ERF, it becomes possible to conduct a low-speed control more stably and with higher precision than the conventional even by an extremely simple constitution, without requiring an advanced modern control theory. Thus, availability in the industry of the present invention is remarkable.

What we claimed are:

1. A method for controlling a machine, wherein said machine is constituted to include a movable part, and a driving part for driving said movable part in a predetermined direction via shearing stress of a variable Bingham fluid, wherein said method comprises the steps of:

operating said driving part as variably controlling the shearing stress of said variable Bingham fluid correspondingly to a driving force of said movable part, to drive said movable part to a target direction, and decelerating said driving part when said movable part is to be stopped, so that a kinetic energy of said movable part is thermally dissipated.

2. A method for controlling a machine according to claim 1, wherein said driving part comprises a first driving portion for driving in a predetermined direction and a second driving portion for driving in another direction opposite to the predetermined direction, and said movable part is moved to a target position by a driving force of said first driving portion or said second driving portion.

3. A method for controlling a machine according to claim 1, wherein said movable part is a movable part of a machine of a cooperative working control system for performing a cooperative working while directly contacting a human to interact with each other.

4. A method for controlling a machine, wherein said machine is constituted to include a movable part, and a damping part for damping said movable part via shearing stress of a variable Bingham fluid, wherein said method comprising the steps of:

variably controlling the shearing stress of said variable Bingham fluid correspondingly to a moving speed of said movable part to thereby correct a moving resistance of said movable part.

5. A method for controlling a machine according to claim 4, wherein the moving resistance of said movable part is corrected such that the moving resistance of said movable part increases correspondingly to an increase of a moving speed of said movable part, or such that the moving resistance of said movable part becomes substantially constant irrespectively of a variation of the moving speed of said movable part.

6. An apparatus for controlling a machine comprising:

a movable part; and a driving part for driving said movable part in a predetermined direction via shearing stress of a variable Bingham fluid, wherein said driving part is operated while the shearing stress of said variable Bingham fluid is variably controlled correspondingly to a driving force of said movable part, to drive said movable part to a target direction and wherein said driving part is decelerated when said movable part is to be stopped, so that a kinetic energy of said movable part is thermally dissipated.

7. An apparatus for controlling a machine according to claim 6, wherein said driving part comprises;

a first driving portion for driving in a predetermined direction and a second driving portion for driving in another direction opposite to the predetermined direction, and said movable part is moved to a target position by a driving force of said first driving portion or said second driving portion.

8. An apparatus for controlling a machine according to claim 7, wherein the shearing stress of said variable Bingham fluid is controlled by a switching control of an electric field between said first driving portion and said movable part, and another electric field between said second driving portion and said movable part.

9. An apparatus for controlling a machine according claim 6, wherein said driving part is a hollow cylinder, said movable part is a cylinder located within said driving part, and wherein said variable Bingham fluid is inserted between an inner surface of said driving part and an outer surface of said movable part.

10. An apparatus for controlling a machine according to claim 9, wherein said driving force is an output torque of said movable part.

11. An apparatus for controlling a machine according to claim 6, wherein said movable part is a movable part of a machine of a cooperative working control system for performing a cooperative working while directly contacting a human to interact with each other.

12. An apparatus for controlling a machine comprising:

a movable part, and a damping part for damping said movable part via shearing stress of a variable Bingham fluid, and wherein said damping part variably controls the shearing stress of said variable Bingham fluid correspondingly to a moving speed of said movable part to thereby correct a moving resistance of said movable part.

13. An apparatus for controlling a machine according to claim 12, wherein the moving resistance of said movable part is corrected such that the moving resistance of said movable part increases correspondingly to an increase of a moving speed of said movable part, or such that the moving resistance of said movable part becomes substantially constant irrespectively of a variation of the moving speed of said movable part.

14. An apparatus for controlling a machine according to claim 13, wherein said movable part is an output rod of a fluid pressure actuator, and wherein said damping part is connected to said rod, and corrects the moving resistance of said rod.

15. An apparatus for controlling a machine according to claim 14, wherein said damping part comprises a plurality of cylindrical electrodes concentrically located around the axis of said rod.

16. An apparatus for controlling a machine according to claim 14, wherein said fluid pressure actuator is a double-acting cylinder.

17. An apparatus for controlling a machine according to claim 12, wherein said movable part is a movable part of a machine of a cooperative working control system for performing a cooperative working while directly contacting a human to interact with each other.

* * * * *